United States Patent Office 2,928,932
Patented Mar. 15, 1960

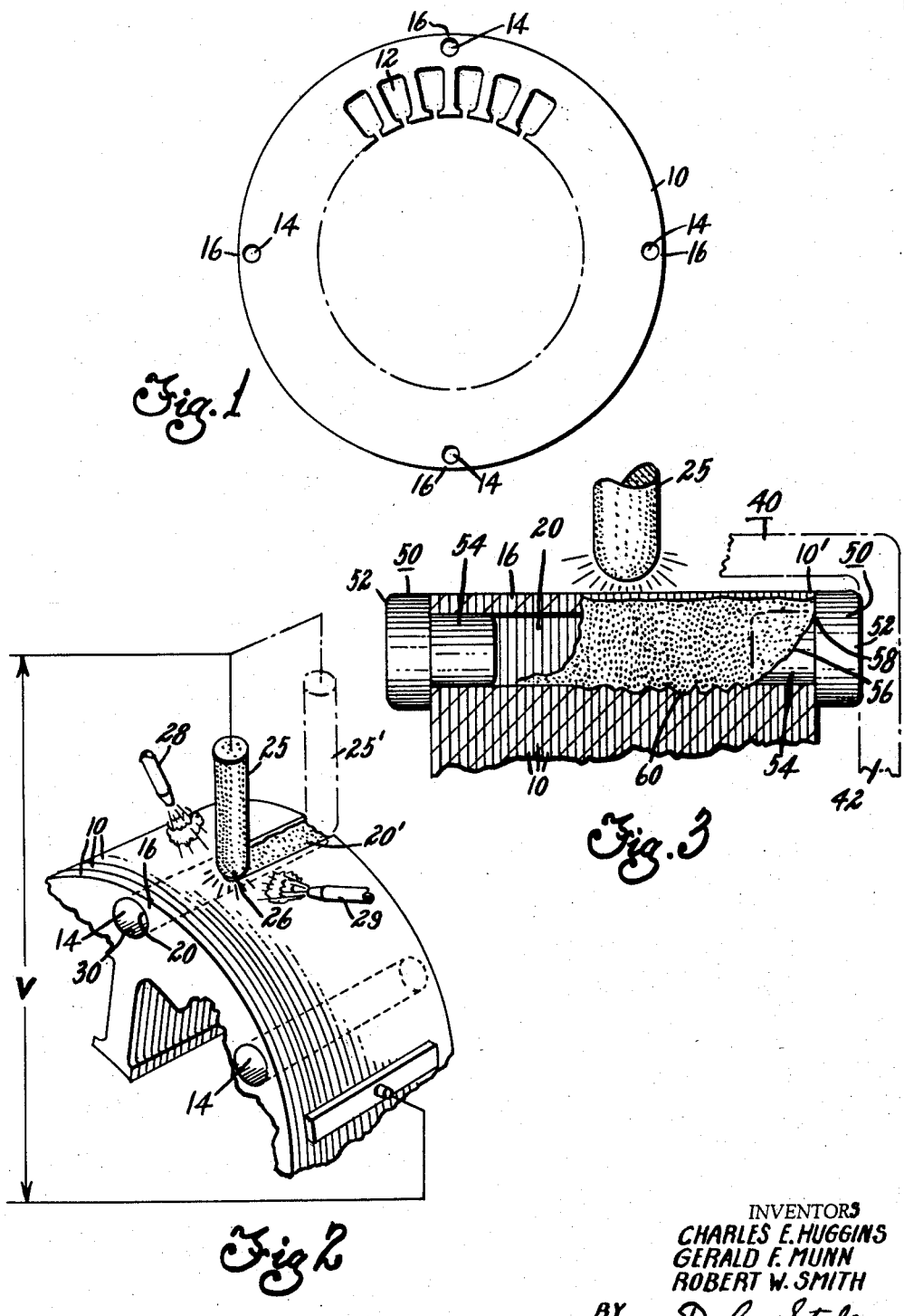

2,928,932

SHEET METAL WELD ASSEMBLY

Charles E. Huggins, Gerald F. Munn, and Robert W. Smith, Dayton, Ohio, assignors to General Motors Corporation, Detroit, Mich., a corporation of Delaware Application July 26, 1957, Serial No. 675,512

10 Claims. (Cl. 219—137)

This invention relates to improvements in laminated assemblies for electrical devices, and particularly, a weld assembly of plural sheet metal laminations.

An object of this invention is to provide a weld assembly of multiple laminations of sheet metal formed quickly with minimum distortion due to heat and free of spattering and splits along the weld due to surface conditions such as moisture or oil on the metal.

Another object of this invention is to provide an improved laminated core construction for an electrical device and a method of manufacturing the same.

A further object is to provide a weld assembly of multiple laminations of sheet metal with a hole in each sheet closely adjacent an edge thereof aligned relative to a corresponding hole in an adjacent sheet forming a tunnel having an outer radial portion which is disintegrated by welding using shielding gas and a consumable electrode during puddling of an electrode material in a groove formed by what remains of the tunnel formed by the holes.

Another object is to provide a welded lamination assembly for electrical devices in which a a tunnel-weld-notch is formed in a plurality of laminations of sheet metal each having holes with a narrow thin bridge adjacent a longitudinal edge of the laminations and having the holes aligned relative to each other to form a tunnel which is changed to a notch as a consumable electrode welding arc progressively pierces the bridge to form the notch that is filled with consumable electrode weld material which joins the laminations to each other.

Another object is to provide a welded lamination assembly for electrical devices in which a tunnel-weld-notch is formed initially as a passage or tunnel covered by a thin bridge longitudinally along a peripheral edge of laminations stacked relative to each other for being fused in a weld including means inserted at an end of the passage to become an integral part of the assembly in the weld for providing support to end laminations and retaining welding material as a puddle in a notch formed of the tunnel due to disintegration of the bridge during welding.

Another object is to provide a welded lamination assembly for a stator of a dynamoelectric machine in which a spacing means is provided together with a weld joint relatively free of defects such as are caused by spattering and splits in the weld.

Further objects and advantages of the present invention will be apparent from the following description, reference being had to the accompanying drawings wherein a preferred embodiment of the present invention is clearly shown.

In the drawings:

Figure 1 is a plan view of a motor stator lamination incorporating features for use in the present invention.

Figure 2 is a fragmentary perspective view of a stator lamination welded assembly in accordance with the present invention.

Figure 3 is a fragmentary cross sectional view of another embodiment of the welded lamination assembly in the present invention.

In Figure 1 of the drawings, there is illustrated a lamination or piece of sheet metal for use in a laminated stator or core assembly in a dynamoelectric machine, transformer laminated assembly, or other electrical device. The lamination 10 is formed of magnetic steel or iron and is provided with a plurality of winding slots 12 extending radially inwardly toward the center of the lamination. For use with the present invention, the lamination is provided with a plurality of openings or holes 14 located immediately adjacent the outer periphery of the lamination. These holes may be formed in any suitable manner such as by punching, drilling, or the like so as to form a narrow edge or thin bridge 16 adjacent thereto along the lamination periphery. The narrow bridge is preferably in a range of between 0.025 to 0.050 inch between the hole and the stator lamination outer diameter.

Figure 2 illustrates a stator lamination assembly in a fragmentary perspective view including a plurality of the laminations 10 located with each hole 14 in each lamination aligned relative to the other to form a continuous tunnel 20 with each bridge 16 adjacent each hole longitudinally aligned relative to each adjacent bridge 16 so that a weld notch 20' can be formed of the tunnel when the laminations are joined relative to each other in accordance with the present invention.

The welded lamination assembly formed in accordance with the present invention involves a method of utilizing the structure described with Figures 1 and 2 together with a consumable electrode indicated by numeral 25 in Figure 2 which is moved progressively adjacent the bridges 16 to cause disintegration of the bridges concurrently with welding of the laminations to each other as follows. The electrode 25 is moved progressively from an initial position indicated in phantom at 25' and a suitable electrical potential is applied for obtaining a welding arc between the electrode and the lamination as diagrammatically indicated by lines to which a potential V is supplied as shown in Figure 2. The consumable electrode can be attached to a handle or other support in a suitable manner and the arcing of electricity between the electrode and the bridges 16 effects a heating of the consumable electrode material to occur adjacent a tip 26 of the electrode 25 such that a melting and fusion of the consumable electrode material occurs together with simultaneous disintegration of the steel or iron forming the bridge 16 of each lamination. The circuit is completed by arcing with flow of molten electrode metal or material from the electrode to the laminations and a puddling of molten electrode material together with the molten iron or steel of the lamination bridges occurs in the bottom of the groove or notch 20' during destruction of the tunnel originally formed by aligning the holes 14 relative to each other.

Since the electrode 25 must be moved progressively along the longitudinal path formed by the holes 14 in providing a tunnel, the method of forming the welded stator lamination in the present invention preferably includes the use of a shielding gas such as carbon dioxide supplied through any suitable means such as jets 28 and 29 adjacent the electrode 25 so as to improve the quality of the puddle weld formed in the groove or notch through disintegration of the bridges 16 forming the tunnel. The arc effected during the welding step pierces the thin bridge 16 on each lamination and fills the groove or notch resulting from the tunnel with weld metal from the consumable electrode. Also, the tunnel is formed with holes having sufficient diameter to provide sufficient depth in the tunnel to maintain the welding arc to form a welding bond below the peripheral surface of the laminations at a radially inner portion or bottom 30 of each hole 14 relative to the center of the lamination assembly.

The puddling weld as formed in the bottom of the groove or notch in the present invention is an improvement over Heliarc welding involving use of both notches and holes with narrow bridges fused by heat of welding in a thin line of fusion along edges without any puddling action in the bottom of a groove or notch. The pieces of sheet metal forming the laminations often are covered with moisture, oil, or other foreign material tending to cause skipping in the weld line and hindering formation of a good and continuous fusion or weld line with the laminations assembled relative to each other as in the present invention. For example, upon heating of the moisture on the sheet metal, an expansion of the moisture forms steam in pockets along the weld which periodically expand or explode to interrupt formation of a continuous weld causing a poor bond to be obtained between laminations. Furthermore, the exploding action caused by formation of steam from the moisture often results in spattering or scattering of material from the heated fusion line to an outer peripheral surface of the lamination assembly and adjacent the line of fusion. The spattering causes both an undesirable surface appearance as well as a risk that the spatter may become loose at a later time resulting in potential damage to an electrical device in which the lamination assembly is used. For example, if the welded stator lamination assembly is to be used in a hermetically sealed motor, a danger exists that the spatter particles may at some time break free of these laminaion surfaces and effect considerable damage inside the hermetically sealed motor.

The step of using shielding gas such as carbon dioxide together with consumable electrode 25 to form a puddle or trough of molten metal in the bottom of the trough relative to the laminations assures minimum spattering because a continuous flow of molten material is able to minimize any effect formation of steam or presence of oil or grease and other foreign material on the sheet metal may have to weaken a resulting weld. The depth of the tunnel maintains the arc below the surface of the outer periphery of the laminations and eliminates nearly all spatter normally associated with carbon dioxide gas shielding. Furthermore, the continuous flow of molten material eliminates any skipping or interruption in the resulting weld as previously encountered. Due to the elimination of this skipping or interruption of the weld, an appreciable saving in the cost of welding laminations together into assemblies is realized due to elimination of a need for patch welding to correct the defects in the weld. Furthermore, the welding methods involving a line of fusion formed such as by using a tungsten weld result in considerable distortion along the welding surface ranging sometimes upwards of six thousandths of an inch. This distortion is due to the delay in heating of metal adjacent the weld surface when tungsten type welding is used to join laminations. To permit smooth tungsten type welding, the distortion as well as the spattering and splitting defects in the weld result in a limitation in the speed of forming the weld by progressive longitudinal movement of a welding apparatus. The previous maximum rate of welding was found to be within a range of 20 to 25 inches of weld formed per minute.

The welding method as applied to lamination assembly in the present invention using puddling of molten consumable electrode material into a notch or groove provides approximately one-third less distortion of the laminations due to the larger quantity of heated material in contact with the welding surface of the laminations. Thus the heat is more quickly distributed through the metal adjacent the welding surfaces and it has been found that, at the most, a distortion of four thousandths of an inch is encountered. This decreased distortion does not result in splits or interruptions of the weld due to the puddling action of the molten weld material. Since the distortion is less and the heat is more readily dispersed to metal adjacent the weld surfaces, a much higher rate of welding is achieved with the method of the present invention. It has been found that the puddling weld permits longitudinal welding of a tunnel-weld-notch at a rate upwards of 60 inches of weld formed per minute. It is thus quite apparent that the distortion of the metal in the laminations is reduced by approximately one-third and the speed of welding is increased to almost three times the speed previously attainable.

A gas such as argon used with tungsten welding for shielding purposes is also more expensive than a shielding gas such as carbon dioxide used with the consumable electrode material in the present invention. Thus, there is a decreased welding cost, there is less patch welding, a greater speed in welding resulting in greater production together with an improved weld having a cleaner appearance as well as a greater safety value due to elimination of spattering as caused by moisture and other foreign material in previous welding methods.

A modification of the puddle weld as described with Figure 2 is shown in a fragmentary cross sectional elevational view of Figure 3. The laminations 10 are aligned relative to each other so as to produce a tunnel formed of holes 14 aligned relative to each other as explained above. The view in Figure 3 shows these laminations adjacent a phantom representation of a frame or housing 40 within which the assembled laminations are to be mounted. The housing has a radial portion 42 located adjacent a lamination surface at a location extending transversely of the longitudinal path of the welding notch formed by consumable electrode 25 as described above. The modification in Figure 3 provides spacing means generally indicated by numeral 50 which are joined or fused with the puddle weld in the notch or groove in accordance with the present invention.

The spacing means 50 provide a head portion 52 having a thickness such that the laminations 10 of the stator assembly are maintained a predetermined distance from the lateral portion 42 of the frame or housing 40 indicated by the phantom lines in Figure 3. In addition to the head portion 52, each spacing means 50 has a reduced diameter portion 54 extending laterally and longitudinally from one side of the head portion for engagement into the tunnel 20 by insertion into the holes 14 of each of the laminations 10. The diameter of the holes 14 may be substantially equal to or slightly larger than the external diameter of the portion 54 of spacing means 50 so that, prior to the puddle welding of the laminations in a completed stator assembly, the spacing means 50 can be inserted or press-fitted into the tunnel. The spacing means 50 may be made of a material such as iron or steel and this material is fusable together with the consumable electrode material and sheet metal of the bridges across the holes so as to become an integral part of the fused weld formed in the trough or groove as described in Figure 2. The spacing means 50 can be a flat-headed rivet which is inserted into the holes such that when the consumable electrode is moved longitudinally to disintegrate the bridges over the tunnel, the reduced diameter portions 54 are fused into the puddle of weld material. An additional function served by the spacing means is the assurance that the puddle material is retained within the longitudinal confines of the trough so that no leakage of this puddled material can occur through open ends of the trough.

One of the difficulties previously encountered in welding a plurality of laminations into an assembly such as for a stator of an electrical motor or generator is due the fact that with a tungsten weld using a shielding gas there is insufficient heating at the beginning of a weld line, and, therefore, the end laminations on opposite sides of the assembly are often not securely joined to the assemblies in the weld. As indicated with reference to Figure 2, the puddling of weld material as in the present invention assures a positive bond that includes the end lamination as well as the whole stacked array of laminations due to the continuous trough of flowable material formed by disintegration of the bridge across the tunnel with complete filling of the tunnel with weld metal. The spacing means 50 through the enlarged head portion 52 thereof closes off the ends of the tunnel to retain fused weld metal within the trough to form a positive bond between the laminations, the spacing means, and weld metal. When the spacing means are provided in the tunnel, the electrode 25 begins the welding operation with the first lamination 10', for example, and a progressive bonding action occurs during progressive heating of the metal surrounding the weld such that a taper 56 occurs beginning from a meeting edge 58 at the juncture of head portion 52 and the reduced diameter portion 54 of the spacing means or flat-headed rivet inserted into the holes of the laminations. This taper continues to the bottom 60 of the trough where a positive bond between the laminations is formed. The consumable electrode is moved progressively longitudinally in the path of the trough to form a continuous puddle of welding material as in the embodiment of Figure 2. It is to be understood that the bond of the reduced diameter portion 54 with the trough of weld metal and lamination is fused into a unitary juncture. The head portion 52 is positively joined to the trough of weld metal through the reduced diameter portion 54 and the head portion 52 forms additional binding support relative to an end lamination such as 10' to retain the end lamination positively with the welded stator assembly. Thus the spacing means provide an improved trough for containing weld metal by preventing leakage at ends of the trough. Furthermore the spacing means provide additional binding support for end laminations and also provide a means for locating a stator lamination assembly for a dynamoelectric machine in spaced relation with a frame or housing.

With the weld metal completely filling the tunnel without spattering or splits in the weld, a good and strong bond is obtained in the lower annular periphery as at the bottom 60 of the trough remote from the outer diameter or periphery of the stacked laminations. This bond is well below the surface of the outer periphery of the stator and eliminates the disadvantage of weakness encountered with a weld formed longitudinally on the outer peripheral surface when a final turning or grinding operation is performed on the outer periphery of the stator laminations. The weld as formed in the present invention cannot be severed or weakened by such a turning or cutting of the outer periphery because of the depth of the tunnel which maintains the fusion of the weld metal and laminations well below the surface of the outer periphery and also assures that a minimum of spatter normally associated with carbon dioxide gas shielding does not mar the outer peripheral surface of the stator lamination assembly.

The method of forming the weld in the present invention may be summarized as comprising the steps of providing holes adjacent the outer peripheral edge of sheet metal pieces such that a narrow thin bridge is formed, the aligning of the holes with the bridges in a longitudinal path relative to each other in stacking of the laminations to prepare for forming a welding lamination assembly, passing of a consumable electrode longitudinally along the path of a tunnel or passage formed by holes aligned relative to each other, disintegration of the bridges over the holes to transform the tunnel into a trough or a groove containing a puddle of weld metal fusing with the lamination metal along the bottom of the trough, and optionally, the added steps of providing means which close off the ends of the tunnel prior to welding to retain weld metal in the trough during and after formation of the weld and also providing built-in spacing means for the lamination assembly relative to a frame or housing as well as providing additional support for retaining end laminations in the assembly. The specific lamination assembly structure formed through use of the spacing means facilitates mounting of a welded stator lamination in accordance with the present invention in any frame or housing.

While the embodiments of the present invention as herein disclosed constitute preferred forms, it is to be understood that other forms might be adopted.

What is claimed is as follows:

1. In a method of manufacturing a core member for an electrical device, the steps comprising, providing sheet metal pieces each having openings formed with a thin bridge adjacent to a radially outer peripheral edge of the pieces, aligning the openings with bridges relative to each other in a path to form a tunnel of predetermined depth below the outer peripheral surface of the pieces, disintegrating the bridges with a consumable electrode welding arc confined by the tunnel and shielding gas to minimize spatter of welding material and metal, and puddling a continuous flowable quantity of molten consumable electrode metal simultaneously with metal of the tunnel by the bridges in a notch formed of the tunnel by disintegration of the bridges as heat of the arc exists only to bond the pieces in a fusion weld along a radially inner bottom periphery of the notch with a minimum of weld material spattering, skipping, and splitting due to said continuous molten metal puddling effected at a speed approximately three times as fast as that possible with tungsten-type welding and resulting in substantially ⅓ less distortion of the sheet metal pieces.

2. In a method of manufacturing a core member for an electrical device, the steps comprising, providing sheet metal pieces each having openings formed with a thin bridge adjacent to a radially outer peripheral edge and surface of the pieces, aligning the openings with bridges relative to each other in a path to form a tunnel of predetermined depth below the outer peripheral surface of the pieces, closing off ends of the tunnel with a means insertable therein, disintegrating the bridges with a consumable electrode welding arc confined by the tunnel and shielding gas, and puddling a molten continuous flow of consumable electrode metal with metal of the bridges simultaneously fused with the means closing off the ends and the pieces in a trough formed of the tunnel by disintegration of the bridges as heat of only the arc is applied in conjunction with the consumable electrode metal.

3. In a method of manufacturing a core lamination assembly for a dynamoelectric machine, the steps comprising, providing sheet metal pieces each having openings formed with a narrow bridge adjacent to a radially outer peripheral edge of the pieces, aligning the openings with bridges relative to each other in a path to form a tunnel of predetermined depth below the outer peripheral surface of the pieces, closing off opposite ends of the tunnel with a means insertable therein, disintegrating the bridges with a consumable electrode welding arc as a sole source of heat confined to the path formed by the predetermined tunnel depth as well as a relatively inexpensive shielding gas such as carbon dioxide, and puddling continuous molten flow of consumable electrode metal with metal of the bridges fused with the means closing off the ends and the pieces in a trough formed of the tunnel by disintegration of the bridges and confined longitudinally by said closing off of ends.

4. A laminated core member assembly for an electrical device, comprising, a plurality of pieces of sheet metal each having openings formed along an outer peripheral edge of said pieces, the openings being aligned relative to each other in a path to form a laterally confined groove of predetermined depth below the outer peripheral edges, and retaining means inserted in each of opposite longitudinally-spaced ends of the groove and adapted to close off each groove end longitudinally to retain a puddle of molten consumable electrode material as well as molten metal of the bridges bonded to the pieces along a bottom peripheral surface of a trough formed during welding with a consumable electrode arc, said retaining means having a fused relation to said consumable electrode material in cooperation with which said retaining means also serves to hold the assembly together.

5. The core assembly of claim 4 in which said retaining means has a head portion and reduced diameter portion, said reduced diameter portion being press-fitted into the groove formed by pieces of sheet metal at each end and adapted to be at least partially fused in the puddle by the welding arc, said head portion serving to retain end pieces more securely with the welded core assembly.

6. A laminated core member for an electrical device having a housing, comprising, a plurality of pieces of sheet metal each having openings for electrical windings, means on each of said pieces aligned in a path forming a groove having a predetermined depth below an outer peripheral surface of said plurality of pieces, means closing off each end of the groove and serving to space said pieces of the core member relative to the housing, and a consumable electrode weld material puddled in a trough formed by said closing means at opposite ends and by sides of the groove during progressive deposition of molten consumable electrode material bonded relative to said plurality of pieces of sheet metal subjected to a welding arc, said consumable electrode weld material joined to said closing means also retaining end pieces of sheet metal positively with the core member.

7. The core member of claim 6 in which said closing means is a rivet-like member having both a head portion for retaining the end laminations and an integral reduced diameter portion which is press-fitted into the groove end such that said reduced diameter portion is fused at least in part relative to said consumable electrode weld material which in cooperation with said head portion holds end pieces of sheet metal positively as part of said laminated core member.

8. A laminated core member for an electrical device having a housing with radial wall portions, comprising, a plurality of pieces of sheet metal having means forming a longitudinal groove along an outer peripheral edge of said pieces, spacing means including in end portions of said groove forming means and projecting outwardly on one side of an end piece of sheet metal and adapted to provide predetermined spacing between the housing radial wall portion and said laminated core member, and a weld formed along one surface of said means forming the longitudinal groove and made integral with both said pieces of sheet metal and said spacing means, said spacing means in cooperation with said weld holding end pieces of sheet metal positively to said core member.

9. A laminated core member for an electrical device, comprising, a plurality of pieces of sheet metal, each having means forming a longitudinal groove along an outer peripheral edge of said pieces, said groove forming means having side walls of predetermined depth to confine space of the groove laterally, and a single molten mass of consumable electrode weld material puddled and bonded simultaneously to said pieces of sheet metal along a radially inner and bottom portion of the groove as heat of an electric arc exists relative to the consumable electrode weld material, said molten mass of consumable electrode material being confined laterally by the side walls of the groove of said laminated core member and serving to fuse with said sheet metal that is distorted less due to preheating by the molten mass of consumable electrode weld material which smothers moisture and/or oil and foreign material that otherwise expands upon heating to cause undesirable spatter of weld material and splitting between pieces of sheet metal.

10. A laminated core member for an electrical device, comprising, a plurality of pieces of sheet metal, each having means including a bridge forming a longitudinal tunnel in space adjacent to an outer peripheral edge of said pieces, said tunnel forming means having side walls of predetermined depth to confine space of the tunnel laterally progressively as said bridge is removed to form a radially open groove in the space, and a single molten mass of consumable electrode weld material puddled and bonded simultaneously relative to said pieces of sheet metal along a radially inner and bottom portion of the groove as heat of an electric arc exists only relative to the consumable electrode weld material and pieces of sheet metal, said molten mass of consumable electrode material being confined laterally by the side walls of the groove of said laminated core member such that said molten mass including metal of said bridge and said consumable electrode weld material bonds and puddles neatly relative to and preheats said sheet metal which distorts substantially $\frac{1}{3}$ less than with tungsten-type welding followed by subsequent fill accomplished by use of an additional supply of heat entirely eliminated and superfluous.

References Cited in the file of this patent

UNITED STATES PATENTS

| 2,448,785 | Dolan | Sept. 7, 1948 |
| 2,715,193 | Staley | Aug. 9, 1955 |